May 11, 1943.  J. P. JOHNSON  2,319,134
COUPLING
Filed Aug. 14, 1940

INVENTOR.
JAMES P. JOHNSON
BY
ATTORNEY.

Patented May 11, 1943

2,319,134

UNITED STATES PATENT OFFICE 2,319,134

COUPLING

James P. Johnson, Shaker Heights, Ohio

Application August 14, 1940, Serial No. 352,556

5 Claims. (Cl. 64—27)

This invention relates to couplings and has for its primary object to provide a flexible coupling unit of improved construction adapted to connect a drive member and a driven member in such a manner that impulses and vibrations ordinarily transmitted therebetween are absorbed so as to eliminate or materially reduce fatigue and breakage due to crystallization of the respective parts.

Another object of the present invention resides in effectively balancing the coupling so that a more uniform distribution of the load is provided which eliminates or reduces wear to a minimum.

Another object of the present invention is to provide a flexible coupling which functions with equal efficiency in opposite directions without the necessity of removal or reversibility of parts.

Another object of the present invention resides in providing an improved simple and expedient means for pre-loading the flexible coupling to adapt the same to different conditions.

Another object of the present invention resides in the use of contractible coil springs, one within the other operating in cooperative unison, the resistance to torque being effected by compression of the springs.

Another object of the present invention is to provide means for retaining a lubricant for the relatively movable parts which materially reduces wear and therefore increases the life and efficiency of the coupling.

Another object of the present invention is to provide a flexible coupling unit which is simple in construction, efficient in operation, and inexpensive to manufacture and assemble.

With the objects above indicated, and other objects hereinafter explained in view, my invention consists in the construction and combination of elements hereinafter described and claimed.

Referring to the drawing.

Figure 1:
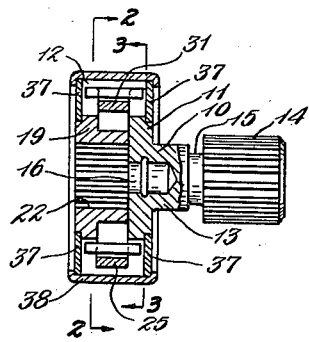
Figure 1 is a longitudinal vertical sectional view of a coupling embodying the present invention.

In the drawing I have illustrated a flexible coupling embodying the present invention and while particularly designed for use in connection with pumps for aircraft, it will be obvious that the coupling may be otherwise adapted under conditions where similar results are desirable.

Figure 4:
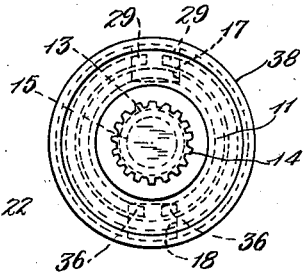
Figure 4 is an end view of the coupling looking from the right of Figure 1.
Figure 5:
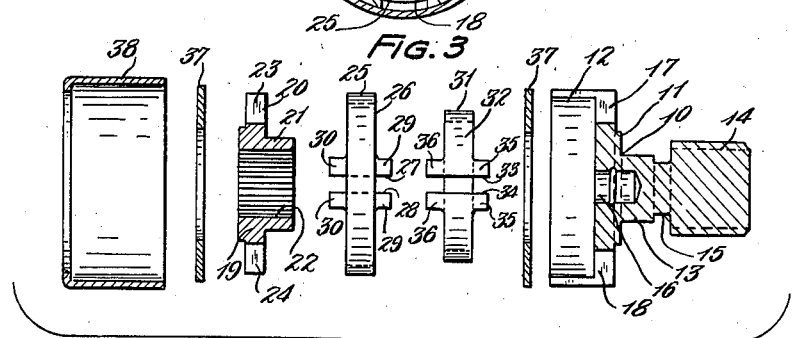
Figure 5 is a longitudinal vertical sectional view with the elements in extended relation in their manner of assembly, the parts being illustrated in full size.

The coupling is preferably a self-contained unit and comprises a drive member 10 preferably made of steel or other suitable material. The latter as shown in Figure 1 consists of a circular end flange 11, of the desired diameter, which is provided with a rearwardly extending marginal flange 12 formed integral therewith and of sufficient length for a purpose to be later described. Projecting axially outwardly from the end flange 11 is an extension 13, of relatively small size, its outer end being provided with an externally splined pinion 14, of slightly larger diameter, the adjacent connecting portion therebetween being formed with a circumferential groove 15 providing a weakened portion readily breakable in the event of any excessive loads thus preventing damage to the pump elements. The inner face of the flange 11 is provided with a counterbore 16 extending axially inwardly thereof and preferably should be of complementary contour to the end of the pump shaft or driven element thus affording a suitable bearing to maintain proper alignment. The end flange 11 is further provided with a pair of recesses 17 and 18 respectively located on diametrically opposite sides and extending inwardly from the peripheral edge thereof as more clearly shown in Figure 4. The adjacent portions of the marginal flange 12 are likewise slotted for a purpose to be later described.

A driven member 19 is formed of steel or other suitable material and comprises a circular end flange 20 of sufficient diameter to slidably and rotatably fit within the outer end of the flange 12 as more clearly shown in Figure 1. An extension 21 extends axially inwardly from the flange 20 and is of sufficient length to suitably abut the inner face of the flange 11 and an internally splined opening 22 extends axially through the flange 20 and extension 21 and is of suitable diameter to receive the splined pinion provided on the pump shaft to which it is drivingly connected. The end flange 20 is likewise provided with a pair of recesses 23 and 24 respectively which are disposed on diametrically opposite sides and extend inwardly from the peripheral edge thereof, the recesses in both end flanges being spaced apart but in longitudinal alignment when the coupling is in its normal position.

Figures 2, 3:
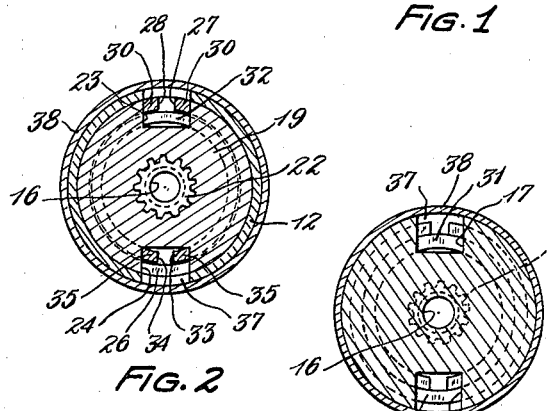
Figure 2 is a transverse sectional view taken on line 2—2 in Figure 1.
Figure 3 is a transverse sectional view taken on line 3—3 in Figure 1.

Any suitable means for flexibly connecting the drive member to the driven member may be employed in order to obtain the desired result contemplated by the invention but a very simple and efficient connection comprises the use of a pair of coil springs so disposed relatively that a balancing of the load is thereby effected. The springs are substantially duplicates structurally except that one is smaller in diameter than the other due to the fact that in the preferred arrangement one is mounted concentrically inside of the other. The outer spring 25, preferably made of stainless spring steel material, comprises a substantially flat coiled portion 26 of suitable width having free ends 27 and 28 spaced apart relatively, each of said ends being provided with a pair of laterally projecting ears 29 and 30 respectively which are likewise disposed on opposite sides. The inner spring 31 is likewise made of stainless spring steel material and comprises a substantially flat coiled portion 32 of the same width as the coiled portion 26 but of relatively smaller diameter for coaxial disposition within the outer spring 25 as more clearly shown in Figures 1 and 2. The inner spring has free ends 33 and 34 spaced apart relatively, each of said ends being provided with a pair of laterally projecting ears 35 and 36 which are likewise disposed on opposite sides. When the springs are in assembled relation the ears 29 and 30 on the outer spring are positioned diametrically opposite to the ears 35 and 36 on the inner spring or as shown in the drawings approximately 180 degrees apart. The outer spring 25 is of such diameter that it will fit within the inner peripheral wall of the flange 12 and the pair of ears 29 project outwardly into the adjacent recess 17 and engage the opposite end walls thereof while the pair of ears 30 project into the adjacent recess 23 and engage the opposite end walls thereof. The inner spring 31 encircles the extension 21 on the driven member and its pair of ears 35 project into the adjacent recess 24 on the driven member and engage the opposite end walls thereof while the pair of ears 36 project outwardly into the adjacent recess 18 and engage the end walls thereof. With this type of drive a balanced load results due to the fact that the driving is effected from two diametrically opposite points in the assembly. This will probably be better understood by referring to Figures 2 and 4 wherein when the driven member 19 moves in a clockwise direction, as viewed in Figure 2, the recess 23 also moves in a clockwise direction and causes the end 28 of the outer spring to move toward the end 27 due to engagement between the wall of the recess and the adjacent ear 30. The end 27 of the outer spring is prevented from traveling in the direction of movement of the driven member due to the fact that its opposite ear 29 projects into the recess 17 in the drive member and is held thereby against relative movement. The action on the inner spring during this relative movement of the drive and driven members is that the end 33 of the inner spring is moved toward the end 34 by reason of movement of the recess 24 and its engagement with the adjacent ear 35 while the ear 36 on the spring end 34 engages the adjacent wall of the recess 18 formed in the drive member and thus maintains this end relatively stationary. It will be noted therefore that during relative movement of the drive and driven members in the direction indicated, the drive is effected at diametrically opposite points thus providing a balanced drive. The operation is the same when the drive and driven members move in the opposite direction except that the other ears are brought into cooperative engagement with their respective recesses. It is apparent therefore that a certain amount of relative movement is afforded between the drive and driven members which is cushioned by the springs affording a flexible drive but providing for a solid drive, when the maximum torque is reached, through engagement of the adjacent free ends of both springs.

It is especially desirable that couplings of this type be properly lubricated and heretofore this has involved some difficulty and a simple and positive manner is afforded in the present construction. A pair of relatively thin circular steel discs 37 are disposed outwardly of the end flanges 11 and 20 respectively of the drive and driven members, the diameters being such as to peripherally align with the outer peripheral surface of the flange 12 and may be suitably mounted, in any desirable manner, upon the drive and driven members. In the present instance, the discs are provided with transverse openings to receive adjacent portions of the drive and driven members and the disc on the driven member is so mounted as to afford relative oscillatory movement therebetween.

To make the coupling self-contained any suitable housing may be provided and in the present instance a brass shell 38 snugly encloses the elements and has its inner end bent around into tight engagement with the marginal edge portion of the adjacent disc while its opposite end is spun inwardly, after assembly, into rigid engagement with the marginal portion of the adjacent disc to securely maintain the parts in assembled relation. By so mounting the discs 37 an oil retaining means is effected which retains sufficient lubricant to suitably lubricate the relatively movable parts in a manner similar to that employed in lubricating ball bearing mountings.

The detailed description thus far is believed to suffice for a clear understanding of the operation of the coupling unit and it is only further necessary to point out that the construction and operation of the elements are such as to afford identical operation irrespective of the direction of rotation of the drive means. This is a decided advantage in that it eliminates the necessity for removal and reversal of parts which ordinarily are required. It is further to be noted that the coupling will work with equal efficiency if the driven end 19 becomes the drive end and the drive end 10 becomes the driven end. The springs are slightly pre-loaded by compression when installed and are so maintained by engagement between the ears and their respective recesses. The amount of pre-loading can be changed any reasonable amount by peening the spring ring before installation to increase the gap between adjacent free ends of the springs in its free position. Other ways for varying the pre-loading may be utilized. The inherent tension of the springs may be varied and regulated by making changes in the thickness and width of the spring material used.

While I have described the preferred embodiment of the invention it is to be understood that I am not to be limited thereto inasmuch as changes and modifications may be resorted to without departing from the spirit of the invention as defined in the appended claims.

What is claimed is:

1. A flexible coupling comprising: a rotatable drive member having a pair of marginal recesses disposed on diametrically opposite sides; a rotatable driven member adapted for unitary rotation with said drive member and having a pair of marginal recesses disposed on diametrically opposite sides, the marginal recesses in one member being normally in longitudinal alignment with the marginal recesses in the other member; said members having a limited amount of oscillatory movement relatively; and flexible means drivingly connecting said members together for unitary rotation including, a pair of independent concentrically arranged resilient looped members, each having free ends spaced apart relatively, the free ends of one resilient member being disposed diametrically opposite to the free ends of the other resilient member, the free ends of both resilient members having pairs of lateral projections extending outwardly on opposite sides, the projections on one of said resilient members being operatively disposed in the adjacent marginal recesses in said drive and driven members while the projections on the other of said resilient members are operatively disposed in the diametrically opposite adjacent recesses in said drive and driven members to thereby effect a balance drive, the ends of the resilient members being prevented from relative separation by engagement between the projections and one of the walls of the recesses while affording yieldable approach.

2. A flexible coupling comprising: a drive member having a laterally extending flange at its inner end; a driven member having a laterally extending flange at its outer end disposed in substantially parallel spaced relation with respect to said drive flange and adapted for unitary movement with said drive member but having a limited amount of relative angular movement with respect to the latter; each of said flanges having a pair of marginally disposed recesses diametrically opposite relatively, the recesses in one of said flanges being normally in longitudinal alignment with the respective recesses in the other of said flanges; and a pair of concentrically arranged resilient looped members disposed between said flanges and having free ends spaced apart relatively, the free ends on different looped members being disposed diametrically opposite and each having pairs of lateral projections extending outwardly on opposite sides, the projections on one of said looped members being operatively disposed in the adjacent recesses in said drive and driven flanges while the projections on the other of said looped members are operatively disposed in the diametrically opposite adjacent recesses in said drive and driven flanges to thereby effect a balanced drive, the ends of the resilient members being prevented from relative separation by engagement between the projections and one of the walls of the recesses while affording relative approach whereby said drive and driven members are flexibly connected for unitary rotation.

3. A flexible coupling comprising: a drive member having a laterally extending flange at its inner end; a driven member having a laterally extending flange at its outer end disposed in substantially parallel spaced relation with respect to said drive flange and adapted for unitary movement with said drive member but having a limited amount of relative angular movement with respect to the latter; each of said flanges having a pair of marginally disposed recesses diametrically opposite relatively, the recesses in one of said flanges being normally in longitudinal alignment with the respective recesses in the other of said flanges; and a pair of concentrically arranged resilient looped members disposed between said flanges and having free ends spaced apart relatively, the free ends on different looped members being disposed diametrically opposite and each having pairs of lateral projections extending outwardly on opposite sides, the projections on one of said looped member being operatively disposed in the adjacent recesses in said drive and driven flanges while the projections on the other of said looped members are operatively disposed in the diametrically opposite adjacent recesses in said drive and driven flanges to thereby effect a balanced drive, the ends of the resilient members being prevented from relative separation by engagement between the projections and one of the walls of the recesses while affording relative approach whereby said drive and driven members are flexibly connected for unitary rotation; the ends of said resilient members being adapted for engagement when the torque is in excess of desired resistance of the latter whereby a temporary solid drive is effected between said drive and driven members.

4. A flexible coupling comprising: a drive member having a laterally extending flange at its inner end; a driven member having a laterally extending flange at its outer end disposed in substantially parallel spaced relation with respect to said drive flange and adapted for unitary movement with said drive member but having a limited amount of relative angular movement with respect to the latter; each of said flanges having a pair of marginally disposed recesses diametrically opposite relatively, the recesses in one of said flanges being normally in longitudinal alignment with the respective recesses in the other of said flanges; and a pair of concentrically arranged resilient looped members disposed between said flanges and each having free ends spaced apart relatively, the free ends on different members being disposed diametrically opposite and each end having pairs of lateral projections on opposite sides, the projections extending outwardly on one side of one of said looped members being operatively disposed in one of the recesses in said drive flange and the projections on the other side of said looped member being operatively disposed in the normally aligned recess in said driven flange, the ends of the resilient member being prevented from relative separation by engagement between the projections and one of the walls of the recesses while affording relative approach, the projections on one side of the other of said looped members being operatively disposed in the other of said recesses in said drive flange while the projections on the other side of said looped member are operatively disposed in the normally aligned recess in said driven flange, the ends of the resilient member being prevented from relative separation by engagement between the projections and one of the walls of the recesses while affording relative approach whereby a balanced drive is effected and said drive and driven members flexibly connected for unitary rotation.

5. A flexible coupling comprising: a drive member having a laterally extending flange at its inner end formed with a rearwardly extending marginal flange; a driven member having a laterally extending flange at its outer end disposed for oscillation in the open end of said marginal flange in substantially parallel spaced relation with respect to said drive flange; flexible means drivingly connecting said drive and driven flanges together for unitary rotation; discs disposed upon the outer faces of said lateral flanges and having their outer edges in peripheral alignment longitudinally; and a shell fitted around the marginal flange of said drive member and having its opposite ends turned inwardly into engagement with the outer adjacent marginal portion of said discs for maintaining said elements in assembled relation.

JAMES P. JOHNSON.